(12) United States Patent
Nagatsuka et al.

(10) Patent No.: US 7,742,839 B2
(45) Date of Patent: Jun. 22, 2010

(54) ROBOT SYSTEM PROVIDED WITH ROBOT CONTROLLER

(75) Inventors: Yoshiharu Nagatsuka, Yamanashi (JP); Hirohiko Kobayashi, Fujiyoshida (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 944 days.

(21) Appl. No.: 11/180,670

(22) Filed: Jul. 14, 2005

(65) Prior Publication Data

US 2006/0015218 A1 Jan. 19, 2006

(30) Foreign Application Priority Data

Jul. 15, 2004 (JP) ............................. 2004-208095

(51) Int. Cl.
*G05B 19/04* (2006.01)
*G05B 19/18* (2006.01)
*G05B 15/00* (2006.01)

(52) U.S. Cl. ................. 700/250; 700/245; 700/246; 700/247; 700/248; 700/249; 700/251; 700/252; 700/253; 700/254; 700/256; 700/257; 700/258; 700/259; 700/260; 700/261; 700/262; 700/263; 700/264

(58) Field of Classification Search ............ 901/1–50; 700/245–264

See application file for complete search history.

(56) References Cited

U.S. PATENT DOCUMENTS 4,611,380 A * 9/1986 Abe et al. ..................... 29/430
4,827,395 A * 5/1989 Anders et al. ................. 700/9
4,969,108 A * 11/1990 Webb et al. ................. 700/259

(Continued)

FOREIGN PATENT DOCUMENTS

EP 0 084 574 A 8/1983

(Continued)

OTHER PUBLICATIONS

Japanese Notice of Reasons for Rejection mailed Feb. 26, 2008 issued in Japanese Application No. 2004-208095 (including a partial translation thereof)).

(Continued)

*Primary Examiner*—Khoi Tran
*Assistant Examiner*—Bhavesh V Amin
(74) *Attorney, Agent, or Firm*—Drinker Biddle & Reath LLP

(57) ABSTRACT

A robot controller capable of automatically preparing a job program for a workpiece configured of a plurality of job elements is disclosed. A plurality of teaching programs for teaching the job for each job element making up the workpiece are stored in advance. Each teaching program has registered therein attribute information including the item number (identification information) and the sequence of application of the teaching program to each workpiece. The robot controller retrieves teaching programs having registered therein, as attribute information, the same item number as the input item number of the workpiece and prepares a main program such that the retrieved teaching programs are called sequentially as subprograms in accordance with the application sequence specified by the attribute information. Further, commands for moving to the job starting position and the job end position are added before and after the main program thereby to complete the main program. Based on the main program thus prepared, the robot controller controls the robot operation.

9 Claims, 3 Drawing Sheets

U.S. PATENT DOCUMENTS

| | | | |
|---|---|---|---|
| 5,432,702 A | | 7/1995 | Barnett |
| 5,555,347 A | * | 9/1996 | Yoneda et al. ............... 700/247 |
| 5,640,002 A | * | 6/1997 | Ruppert et al. ......... 235/462.46 |
| 5,930,460 A | | 7/1999 | Noumaru et al. |
| 5,942,739 A | | 8/1999 | Zvonar et al. |
| 6,535,790 B2 | | 3/2003 | Nakano et al. |

FOREIGN PATENT DOCUMENTS

| | | |
|---|---|---|
| GB | 2291983 A | 2/1996 |
| GB | 2 314 174 A | 12/1997 |
| JP | 7-295618 | 11/1995 |
| JP | 8-141958 | 6/1996 |
| JP | 8-202427 | 8/1996 |
| JP | 10-15865 | 1/1998 |
| JP | 2001-199527 | 7/2001 |
| JP | 2001-233405 | 8/2001 |

OTHER PUBLICATIONS

European Search Report mailed Oct. 13, 2008 issued in European Application No. 05014994.7.

* cited by examiner ly prepared and register a new teaching program necessary for the job or, alternatively, add a determination process for recognizing the new workpiece to the main program for forming a job program for a plurality of workpieces already registered and add an instruction to call the teaching program for each element required for the job to the branched portion of the main program. As a result, an error such as a command error of the branch instruction or a calling error of the teaching program to be called can occur. Further, the robot operation is required to be suspended during the adding process.

ROBOT SYSTEM PROVIDED WITH ROBOT CONTROLLER

BACKGROUND OF THE INVENTION

1. Field of the Invention

The present invention relates to a robot controller and a robot system wherein, in the case where a workpiece is configured of a plurality of work elements and a job pattern is determined for each work element, the workpiece is processed by a combination of job patterns for the work elements.

2. Description of the Related Art

A conventional method is known in which, in the case where a workpiece is configured of a plurality of elements and the job pattern for each element is determined, a job program for the workpiece is prepared by combining the programs of the job patterns for the work elements. In a robot for conducting a deburring job to deburr a product, for example, a teaching program for the deburring job is prepared for each part making up the product to be deburred, and the deburring job is conducted by calling the teaching program for each of parts making up the particular product from a main program.

In this known method, the main program forms a job program, which determines whether or not every one of the workpieces corresponds to one of the products already registered and, in the case where it is determined that the workpiece is one of the products already registered, sequentially calls a particular teaching program for each particular part (element) of the product required to carry out the job on the product, to thereby carry out the job on the product as a whole.

Note that no reference related to an invention wherein a job program on a product is prepared directly and automatically from teaching programs for elements of a workpiece, as the present invention described below, could be discovered.

In the conventional method wherein each teaching program for each of a plurality of elements making up a workpiece are combined to form a job program for the workpiece, preparation of a job program for a new workpiece (product) requires the operator to prepare and register a new teaching program necessary for the job or, alternatively, add a determination process for recognizing the new workpiece to the main program for forming a job program for a plurality of workpieces already registered and add an instruction to call the teaching program for each element required for the job to the branched portion of the main program. As a result, an error such as a command error of the branch instruction or a calling error of the teaching program to be called can occur. Further, the robot operation is required to be suspended during the adding process.

SUMMARY OF THE INVENTION

Accordingly, it is an object of the present invention to obviate the above-mentioned problem and provide a robot controller and a robot system in which a job program for a workpiece can be easily prepared and preventing any error.

According to one aspect of the present invention, there is provided a robot controller for calling a teaching program related to a workpiece from a plurality of stored teaching programs, and causing a robot to carry out a job in accordance with the called teaching program, which includes a storage means for storing a plurality of teaching programs having registered therein identification information indicating the type of the workpiece as attribute information; a teaching program retrieving means for retrieving all teaching programs having registered therein, as attribute information, the same identification information as a designated identification information, based on the designated identification information, from the plurality of teaching programs stored in the storage means; a main program preparation means for preparing a main program to call and execute the retrieved teaching program as a subprogram; and a main program execution means for executing the prepared main program.

Preferably, in this robot controller, the identification information indicating the type of the workpiece is registered in the teaching program as the attribute information related to the sequence information indicating the job sequence, and the main program is prepared by the main program preparation means such that the retrieved teaching programs are called sequentially as subprograms in accordance with the sequence specified by the sequence information.

The teaching program used for carrying out the job on a plurality of types of workpieces preferably has registered therein, as the attribute information, the same number of sets of identification information as the number of the types of workpieces using the teaching program.

The main program preparation means is preferably adapted to add a command for moving the robot to a predetermined initial position before a command for calling the first subprogram. Also, the main program preparation means is more preferably adapted to add a command for moving the robot to a predetermined final position after a command for calling the last subprogram. Preferably, the robot controller further includes a main program deletion means for deleting the main program after execution thereof.

According to another aspect of the present invention, there is provided a robot system which includes: a robot; the robot controller for causing the robot to carry out the job in accordance with the prepared main program; and an input means for inputting identification information to the robot controller.

In one embodiment, the input means is a visual sensor, and the robot controller identifies a type of the workpiece based on a visual feature obtained by imaging the workpiece with the visual sensor.

In another embodiment, the input means is a bar code reader, and the robot controller obtains a type of the workpiece as the identification information by reading a bar code, attached to the workpiece, with the bar code reader.

In further embodiment, the input means is an IC tag reader, and the robot controller obtains the type of the workpiece as the identification information by reading an IC tag, attached to the workpiece, with the IC tag reader.

As the main program for causing the robot to carry out the job is automatically prepared, the correction of the main program by an operator is not required, unlike the prior art, and, therefore, a program error can be avoided. Also, the work of the robot is not required to be suspended to correct the main program.

BRIEF DESCRIPTION OF THE DRAWINGS

The above and other objects, features and advantages will be described below in more detail based on the preferred embodiments of the present invention with reference to the accompanying drawings, in which.

DETAILED DESCRIPTION

An embodiment of the present invention will be described below with reference to the drawings.

Figure 3:
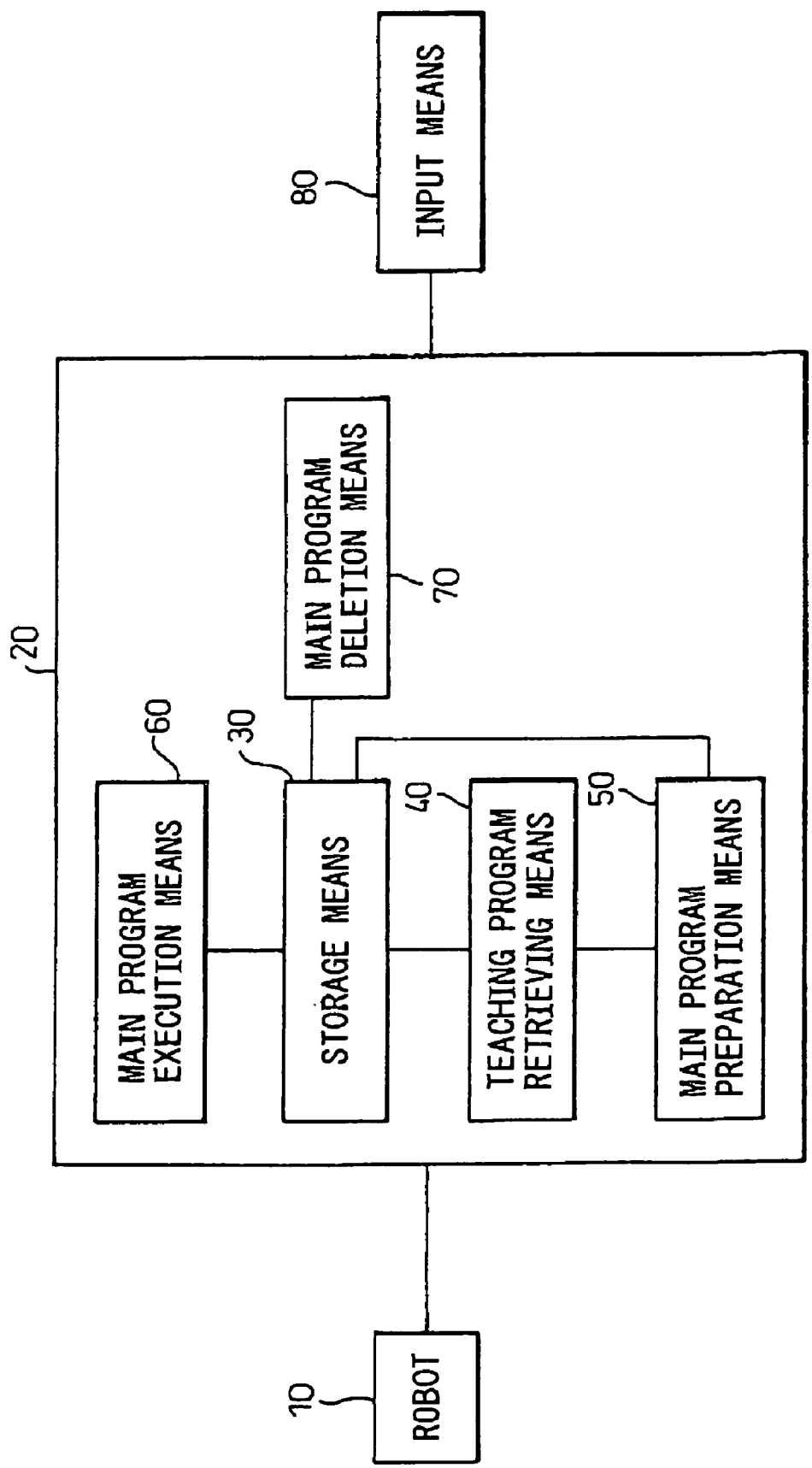
FIG. 3 is a block diagram showing a general configuration of a robot system having a robot controller according to the present invention.

As shown in FIG. 3, a robot system according to the present invention includes a robot 10 for carrying out a job on a workpiece, a robot controller 20 for controlling the operation of the robot 10, and an input means 80 for inputting commands and information to the robot controller 20. The robot controller 20 includes a storage means 30 for storing various teaching programs and a main program, etc. therein, a teaching program retrieving means 40 for retrieving a teaching program meeting specified conditions from those stored in the storage means 30 in accordance with the specified conditions, a main program preparation means 50 for automatically preparing a main program for calling and executing one or more teaching programs as subprogram, a main program execution means 60 for executing the main program thus prepared, and a main program deletion means 70 for deleting the main program after execution thereof.

The hardware configuration of the robot controller 20 according to this embodiment is the same as that of the conventional robot controller, and includes a processor, a memory such as a ROM, a RAM or a nonvolatile RAM, a teaching operation panel having a liquid crystal display means and a keyboard etc. for inputting data and commands, and an axis control circuit for driving axes of the robot 10. As this configuration is identical to that of the conventional robot controller, it is not described in detail. The teaching program retrieving means 40, the main program preparation means 50 and the main program execution means 60 are embodied by a processor executing a predetermined program stored in the ROM, etc. Also, the memory functions as the storage means 80. Further, the teaching operation panel, or especially, the keyboard thereof functions as the input means 80. The input means 80, as described later, may be any one of a visual sensor, a bar code reader and an IC tag reader.

Figure 1:
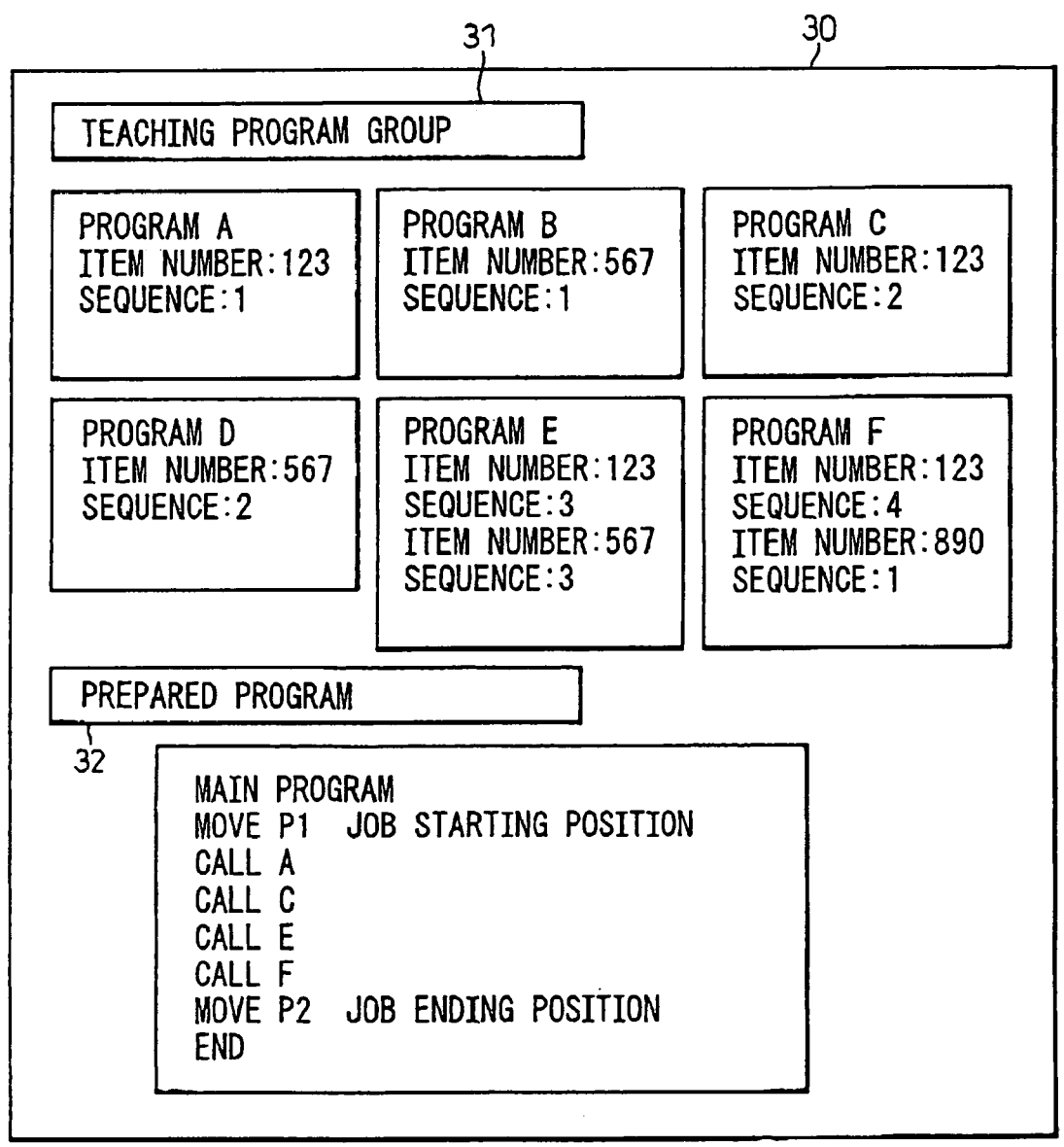
FIG. 1 is a diagram for explaining an example of teaching programs for elements of a workpiece, each teaching program having attribute information, and a main program prepared according to an embodiment of the invention.

FIG. 1 is a diagram for explaining an example of a group of teaching programs 31 for the elements to be retrieved, each program having attribute information, and a main program 32 of a job program, which are stored in the storage means 30 of the robot controller 20 shown in FIG. 3.

The teaching program group 31 to be retrieved is stored in the storage means 30 such as the nonvolatile RAM portion of the memory, and comprises of a plurality of teaching programs each for instructing the job for each of elements (parts) making up a workpiece (product). Each teaching program has registered therein attribute information making up identification information of a product (workpiece) to which the particular teaching program is applicable, and attribute information making up data indicating the sequence of application of the teaching program to the product (workpiece) indicated by the identification information.

In the case shown in FIG. 1, the teaching programs A to F are registered as the teaching program group 31 in the storage means 30. The teaching program A has registered therein attribute information of "item number: 123" and "sequence: 1". This attribute information means that in the case where the item number of 123 is input as identification information of a product (workpiece), this teaching program A is called first and forms a first subprogram making up a portion of a main program to carry out the job on the product (workpiece). Similarly, the teaching program B has registered therein attribute information of "item number: 567" and "sequence 1", the teaching program C has registered therein attribute information of "item number: 123" and "sequence 2", the teaching program D has registered therein attribute information of "item number: 567" and "sequence 2", the teaching program E has registered therein attribute information of "item number: 123" and "sequence 3" and "item number: 567" and "sequence 3", and the teaching program F has registered therein attribute information of "item number: 123" and "sequence 4" and "item number: 890" and "sequence 1".

In order to prepare a job program for a new product (workpiece), in the case where a teaching program for carrying out the job on the element (part) of the product has already registered as one of the teaching programs in the teaching program group 31, an item number (identification information) of the new product (workpiece) and a sequence of application of the teaching program to the product are registered additionally as the attribute information of the particular teaching program. On the other hand, in the case where the product element (part) is so new that the teaching program for the element has not yet been registered in the teaching program group 31 to be retrieved, the teaching program for carrying out the job on the particular element (part) is prepared. Further, the item number (identification information) and the sequence of application of the teaching program to the product (workpiece) indicated by the particular item number (identification information) are registered as attribute information of the particular teaching program, and the revised teaching program is stored additionally as one of the teaching programs of the teaching program group 31 in the storage means 30.

In this way, the teaching programs each for each of parts (elements) making up a product (workpiece), each of which has the attribute information thereof including the item number providing the identification information of the product (workpiece) to which the particular teaching program is applicable and the sequence of application of the particular teaching program to the particular product, are registered in the program group 31 to be retrieved, which is stored in the storage means 30.

Figure 2:
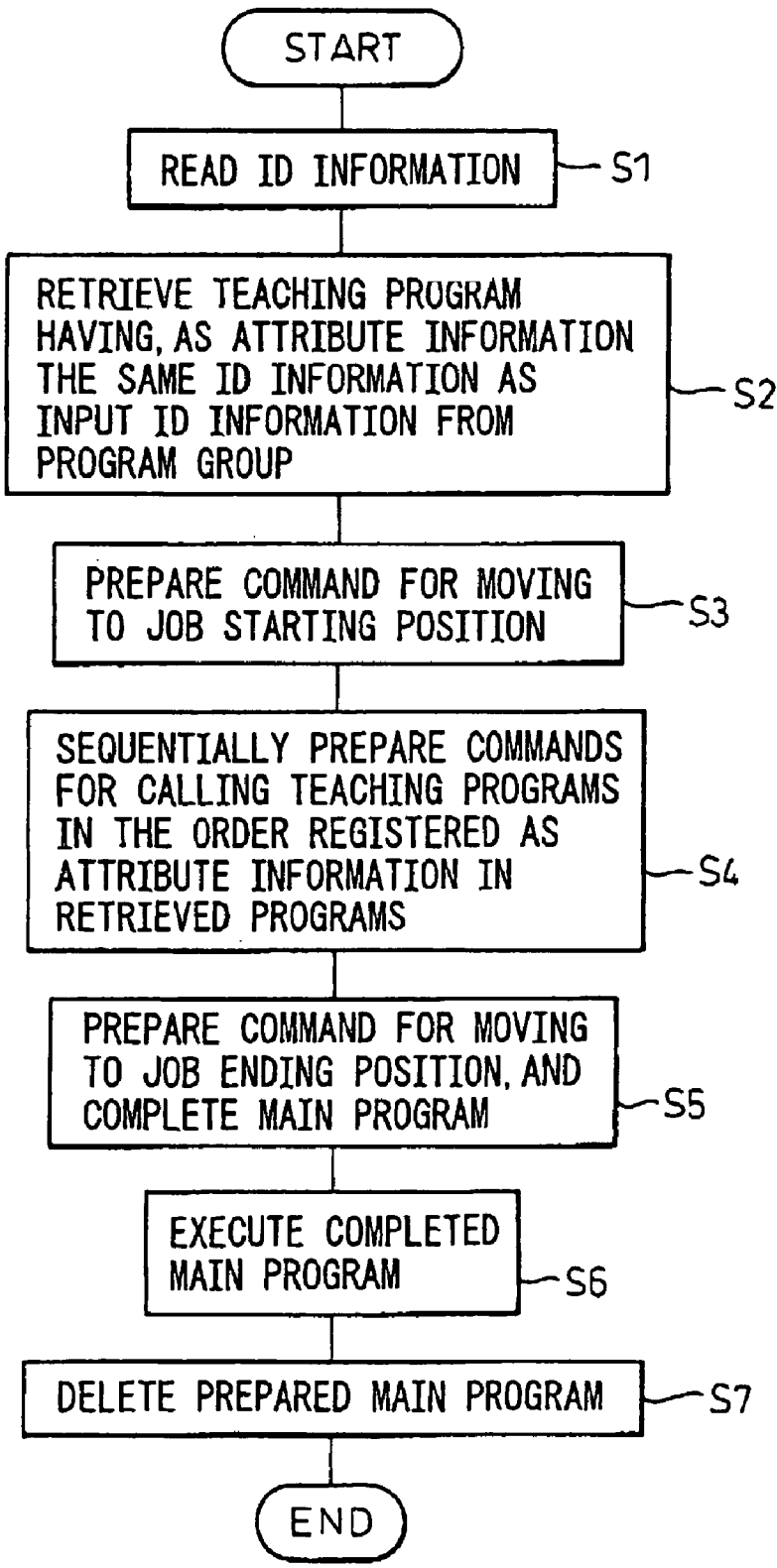
FIG. 2 is a flowchart showing the job operation process executed based on the teaching programs according to the embodiment shown in FIG. 1.

In order to cause the robot to carry out a job on a given product (workpiece), a processing tool is mounted on the forward end of the arm of the robot 10, and the product identification number and a job command are input to the robot controller 20 from the keyboard of the teaching operation panel etc. Once the job command is input, the processor of the robot controller 20 starts the job operation process shown in the flowchart of FIG. 2. An explanation will be given below on the assumption that the product item number "123" is input as identification information.

The processor of the robot controller 20 reads the input identification information (item number: 123) and the input job command (step S1), and uses the teaching program retrieving means 40 to retrieve the teaching program having registered therein as attribute information the same identification information as input identification information (item number: 123), from the teaching program group 31 (step S2). The main program preparation means 50, based on the teaching program thus retrieved, starts to prepare a main program for the robot to carry out the job. First, a command is prepared to move the processing tool (TCP) mounted on the forward end of the arm of the robot 10 to the job starting position (initial position) (step S3). Next, a command is prepared to call, as a subprogram, a teaching program having registered therein the sequence "1" of the attribute information among the retrieved teaching programs. In similar way, commands are prepared sequentially to call the teaching programs having registered therein the sequence "2", "3", "4", . . . of the attribute information in that order as a subprogram among the retrieved teaching programs (step S4). Finally, a movement command is prepared to move the processing tool to the job end position. In this way, the main program is completed and stored in the RAM of a memory such as the storage means 30 thereby to complete the process (step S5).

For example, in the case where the program group 31 to be retrieved as shown in FIG. 1 is registered, when the item number "123" is input as identification information, the teaching programs A, C, E and F having the item number 123 registered therein as attribute information thereof are retrieved. Regarding the order, the teaching program A is 1, the teaching program C is 2, the teaching program E is 3 and the teaching program F is 4. Therefore, as shown in the "prepared program" in FIG. 1, a main program 32 is prepared. In the main program 32 an movement command "MOVE P1" for moving to the job starting position P1, a command for calling the teaching programs A, C, E and F in that order, i.e. "CALL A", "CALL C", "CALL E" and "CALL F", are executed in that order, followed finally by the execution of a command "MOVE P2" for moving to the job end position P2.

Next, the main program execution means 60 executes the main program 32 thus prepared (step S6), and at the completion of the job upon execution of the main program 32, the main program 32 thus prepared is deleted from the storage means 30 (RAM) by the main program deletion means 70 (step S7) thereby to complete the job process. As an alternative, the main program 32 is not deleted from the storage means 30 (RAM), and when the same identification information is input, the main program 32 already prepared may be read and executed.

According to this embodiment, the input item number is used as identification information of a workpiece (product). However, with a visual sensor as the input means 80, the visual feature obtained by imaging the workpiece with the visual sensor may be used as identification information. In this case, this visual feature is registered as attribute information of each teaching program stored in the teaching program group 31 to be retrieved. When starting the job with the robot 10, the workpiece is imaged by the visual sensor, and the visual feature obtained by processing the image of the workpiece is input as identification information. This identification information is compared with the attribute information registered in each retrieved teaching program, and a teaching program having the attribute information coincident with the input identification information is selected.

Also, in view of the fact that an IC tag or a bar code is often attached to the workpiece (product), the workpiece type information registered in the IC tag or the bar code may be used as identification information. In this case, an IC tag reader or a bar code reader is used as the input means 80 to read the identification information from the IC tag or the bar code. The workpiece type information thus read is used as identification information, while at the same time registering it as the attribute information of each teaching program.

In the robot 10 which carries out the job on a great variety of workpieces, a multiplicity of teaching programs for the elements of the workpieces are stored as the teaching program group 31 to be retrieved. However, if a teaching program for an element of a workpiece is required to be changed due to the change of the particular element, programs related to the workpiece are called and displayed as a list using the identification information, and the teaching program to be corrected can be easily detected. Thus, the correction of the teaching program for the element can be facilitated.

According to the embodiment described above, the robot controller 20 prepares the main program 32 by itself and also activates the operation of starting the job by itself. However, in the case where the workpiece (product) is so bulky that a plurality of robots 10 carry out the jobs in different areas thereof, each robot controller 20 for each robot can be connected to a PLC (programmable logic controller) through a communication network or the like. Along with the program for each robot to carry out the job on the corresponding workpiece (product) are registered the identification information making up the attribute information of the particular workpiece and the sequence of the application of the program to the workpiece, in the "program to be retrieved" for each robot. The identification information is transmitted from the PLC to the robot controller 20 of each robot 10. After receiving the signals representing the completion of the main program 32 from all robot controllers 20 of the robots 10, a job start command is output to the robot controllers 20 so that the robots completely ready for the job can start the job.

What is claimed is:

1. A robot controller calling a teaching program related to a workpiece from a plurality of stored teaching programs and causing a robot to carry out a job in accordance with the called teaching program, said robot controller comprising:

a storage means storing a plurality of teaching programs, each teaching program having registered therein, as attribute information, identification information indicating the type of the workpiece to which that teaching program is applicable;

an input means inputting identification information indicating a type of a workpiece on which said robot will carry a job;

a teaching program retrieving means retrieving all teaching programs having registered therein, as attribute information, the same identification information as the input identification information, based on the input identification information, from said plurality of teaching programs stored in said storage means;

a main program preparation means preparing a main program to call and execute the retrieved teaching program as a subprogram; and a main program execution means executing the prepared main program, wherein the identification information indicting the type of workpiece is registered in each teaching program as the attribute information related to the sequence information indicating the job sequence, and the main program is prepared by said main program preparation means such that the retrieved teaching programs are called sequentially as subprograms in accordance with the sequence specified by the sequence information.

2. The robot controller according to claim 1, wherein the teaching program used for carrying out the job on a plurality of types of workpieces has registered therein, as the attribute information, the same number of sets of identification information as the number of the types of workpieces using the teaching program.

3. The robot controller according to claim 1, wherein said main program preparation means adds a command for moving said robot to a predetermined initial position before a command for calling the first subprogram.

4. The robot controller according to claim 1, wherein said main program preparation means adds a command for moving said robot to a predetermined final position after a command for calling the last subprogram.

5. The robot controller according to claim 1, further comprising a main program deletion means deleting the main program after execution thereof.

6. A robot system comprising:
   a robot;
   a robot controller according to claim 1 for causing said robot to carry out the job in accordance with the prepared main program; and
   an input means for inputting identification information to said robot controller.

7. The robot system according to claim 6, wherein said input means comprises a visual sensor, and said robot controller identifies a type of the workpiece based on a visual feature obtained by imaging the workpiece with said visual sensor.

8. The robot system according to claim 6, wherein said input means comprises a bar code reader, and said robot controller obtains the type of the workpiece as the identification information by reading a bar code attached to the workpiece with said bar code reader.

9. The robot system according to claim 6, wherein said input means comprises an IC tag reader, and said robot controller obtains a type of the workpiece as the identification information by reading an IC tag attached to the workpiece with said IC tag reader.

* * * * *